US012493417B2

United States Patent
Liu

(10) Patent No.: US 12,493,417 B2
(45) Date of Patent: Dec. 9, 2025

(54) VERIFIED KEY REPLACEMENT IN SECURE MEMORY DEVICES

(71) Applicant: Micron Technology, Inc., Boise, ID (US)

(72) Inventor: Zhan Liu, Cupertino, CA (US)

(73) Assignee: Micron Technology, Inc., Boise, ID (US)

(*) Notice: Subject to any disclaimer, the term of this patent is extended or adjusted under 35 U.S.C. 154(b) by 131 days.

(21) Appl. No.: 17/831,370

(22) Filed: Jun. 2, 2022

(65) Prior Publication Data
US 2023/0393762 A1 Dec. 7, 2023

(51) Int. Cl.
*G06F 3/06* (2006.01)
*H04L 9/08* (2006.01)
*H04L 9/30* (2006.01)

(52) U.S. Cl.
CPC .......... *G06F 3/0622* (2013.01); *G06F 3/0655* (2013.01); *G06F 3/0679* (2013.01); *H04L 9/0838* (2013.01); *H04L 9/3013* (2013.01); *H04L 9/3066* (2013.01)

(58) Field of Classification Search
CPC .... G06F 3/0622; G06F 3/0655; G06F 3/0679; H04L 9/0838; H04L 9/3066
USPC ....................................................... 713/171
See application file for complete search history.

(56) References Cited

U.S. PATENT DOCUMENTS 6,240,187 B1* 5/2001 Lewis ................ G06Q 20/3829
380/282
10,193,694 B1* 1/2019 Guditz .................... H04L 9/006
11,036,677 B1* 6/2021 Grunwald ............... G06F 3/067
2006/0294378 A1* 12/2006 Lumsden ........... G06Q 20/3829
713/171
2012/0167169 A1* 6/2012 Ge .......................... H04L 9/321
726/2

(Continued)

FOREIGN PATENT DOCUMENTS

WO WO-2016065892 A1 * 5/2016 ............ H04W 12/00
WO WO-2020082160 A1 * 4/2020

OTHER PUBLICATIONS

Fumy et al., "Principles of key management," in IEEE Journal on Selected Areas in Communications, vol. 11, No. 5, pp. 785-793, Jun. 1993, doi: 10.1109/49.223881. (Year: 1993).*

(Continued)

*Primary Examiner* — Peter C Shaw
(74) *Attorney, Agent, or Firm* — Greenberg Traurig

(57) ABSTRACT

The disclosure relates to improvements in the delivery of cryptographic data to secure memory devices. In some aspects, the techniques described herein relate to a method including: receiving, by a memory device, a command, the command including a public key and a hash of a unique device secret (UDS); generating, by the memory device, a local UDS using the public key and a locally stored private key; generating, by the memory device, a local UDS hash by inputting the local UDS into a hashing algorithm; determining, by the memory device, whether the local UDS hash matches the hash included in the command; writing, by the memory device, the public key to a key storage area if the local UDS hash matches the hash included in the command; and returning, by the memory device, a failure response if the local UDS hash does not match the hash included in the command.

18 Claims, 7 Drawing Sheets

(56) References Cited

U.S. PATENT DOCUMENTS

| | | | | |
|---|---|---|---|---|
| 2014/0247939 | A1* | 9/2014 | Hattori | H04L 9/008 380/44 |
| 2015/0310231 | A1* | 10/2015 | Lin | G06F 21/74 713/189 |
| 2018/0190051 | A1* | 7/2018 | Outwater | H04L 63/102 |
| 2019/0058591 | A1* | 2/2019 | Sharpe | G06Q 20/38215 |
| 2019/0230002 | A1* | 7/2019 | Bernat | H04L 63/0823 |
| 2022/0141041 | A1* | 5/2022 | Parikh | G06F 21/44 713/156 |
| 2022/0417030 | A1* | 12/2022 | Shrivastava | G09C 1/00 |
| 2023/0097712 | A1* | 3/2023 | Sullivan | H04L 63/1466 713/171 |

OTHER PUBLICATIONS

Witzke et al., "Key management for large scale end-to-end encryption," 1994 Proceedings of IEEE International Carnahan Conference on Security Technology, Albuquerque, NM, USA, 1994, pp. 76-79, doi: 10.1109/CCST.1994.363791. (Year: 1994).*

Carvajal-Roca et al., "A Semi-Centralized Dynamic Key Management Framework for In-Vehicle Networks," in IEEE Transactions on Vehicular Technology, vol. 70, No. 10, pp. 10864-10879, Oct. 2021, doi: 10.1109/TVT.2021.3106665. (Year: 2021).*

Shan, "On the Security of a Certificateless Strong Designated Verifier Signature Scheme with Non-delegatability," 2020 International Conference on Internet of Things and Intelligent Applications (ITIA), Zhenjiang, China, 2020, pp. 1-5, doi: 10.1109/ITIA50152.2020.9312279. (Year: 2020).*

Han et al., "Two-Factor Distributed Authentication Scheme for Cloud Storage," 2024 9th International Conference on Computer and Communication Systems (ICCCS), Xi'an, China, 2024, pp. 297-303, doi: 10.1109/ICCCS61882.2024.10602986. (Year: 2024).*

Gassend et al., "Caches and hash trees for efficient memory integrity verification," The Ninth International Symposium on High-Performance Computer Architecture, 2003. HPCA-9 2003. Proceedings., Anaheim, CA, USA, 2003, pp. 295-306, doi: 10.1109/HPCA.2003.1183547. (Year: 2003).*

Bravi et al., "Exploiting the DICE specification to ensure strong identity and integrity of IoT devices," 2023 8th International Conference on Smart and Sustainable Technologies (SpliTech), Split/Bol, Croatia, 2023, pp. 1-6, doi: 10.23919/SpliTech58164.2023.10193517. (Year: 2023).*

Naik et al., "A Hardware Implementation of DICE on a RISC-V Processor," 2024 International Conference on Circuit, Systems and Communication (ICCSC), Fes, Morocco, 2024, pp. 1-6, doi: 10.1109/ICCSC62074.2024.10616834. (Year: 2024).*

Barry, "Enabling Certifiable Asymmetric Cryptography for Hardware Attestation Protocols," 2024 Cyber Research Conference—Ireland (Cyber-RCI), Carlow, Ireland, 2024, pp. 1-4, doi: 10.1109/Cyber-RCI60769.2024.10939787. (Year: 2024).*

Adi, "Autonomous Physical Secret Functions and Clone-Resistant Identification," 2009 Symposium on Bio-inspired Learning and Intelligent Systems for Security, Edinburgh, UK, 2009, pp. 83-88, doi: 10.1109/BLISS.2009.16. (Year: 2009).*

* cited by examiner

VERIFIED KEY REPLACEMENT IN SECURE MEMORY DEVICES

FIELD OF THE TECHNOLOGY

At least some embodiments disclosed herein relate generally to memory devices (e.g., semiconductor memory devices) and, in particular, to improvements in cryptographic data storage on secure memory devices.

BACKGROUND

Some memory devices may store cryptographic keys to perform cryptographic operations. Some such secure memory devices may use stored public keys to validate sensitive data (e.g., secure commands, digital signatures, etc.) that are signed using corresponding private keys. If the underlying content of a key is corrupted, current secure memory devices do not provide mechanisms to prevent the writing of an invalid key. As such, if an invalid key is validly provided to such a secure memory device, the invalid key will be persisted, resulting in a malfunctioning or unusable memory device.

DETAILED DESCRIPTION

Figure 1:
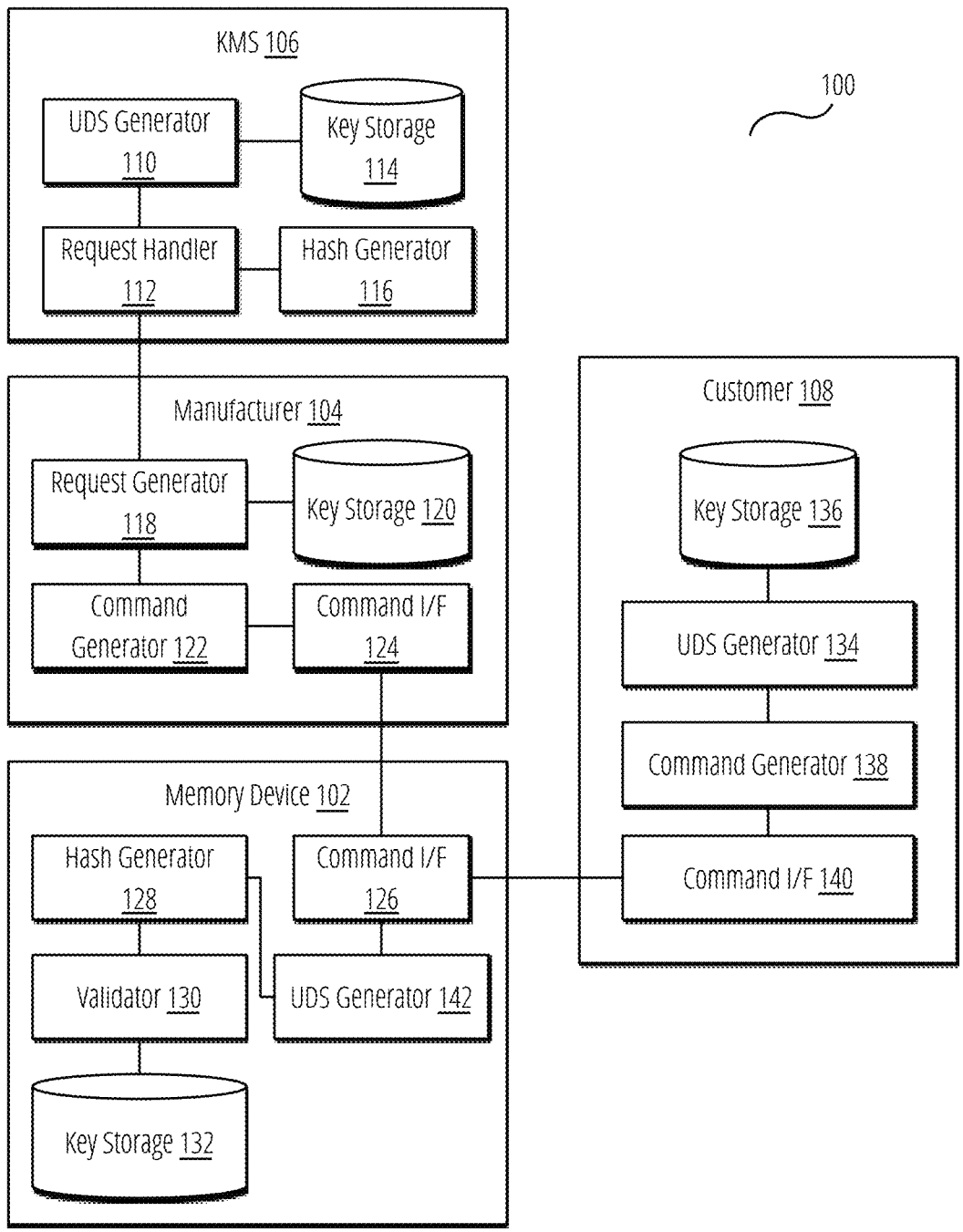
FIG. 1 is a block diagram of a computing system according to some of the example embodiments.

The example embodiments provide techniques that utilize key exchange protocols (e.g., Diffie-Hellman or Elliptic Curve Diffie-Hellman) and unique device secrets to provide a secure mechanism for updating the public keys of a memory device. During manufacturing, each device (e.g., via a manufacturer) provides its public key to a key management server (KMS). The KMS uses its private key and the device's public key to calculate or generate a UDS and then hashes the UDS. The KMS then provides the hash and the public key corresponding to the private key back to the manufacturer. In response, the manufacturer uses a secure command to write the KMS public key and the hash to the memory device. When receiving the command, the memory device will generate a local UDS using the KMS public key and its own private key corresponding to the previously discussed public key of the memory device. It will then calculate its own hash of the UDS and compare this hash to the received hash. If the hashes match, the memory device will write the KMS public key and respond with a success. Otherwise, the memory device will not update the public key and respond with a failure.

According to the key exchange protocol, both the UDS calculated by KMS and the memory device should be the same. Therefore, their hashes should be the same. As used herein, a hash refers to a one-way function, such that knowing the hash will not reveal the contents of the original value, thus providing further security.

After a memory device is released from manufacturing, a customer can write their own public key to the device. To do so, the customer reads the device public key from the memory device and generates its own private key and public key. The customer then calculates its new UDS with its private key and the device public key. The customer then calculates a hash of the new UDS and issues a command to write the new UDS to the memory device which includes the hash of the new UDS and the customer's public key. The memory device generates its own UDS again using the private key of the memory device and the customer's public key. If the hashes match, the memory device will write the customer public key and respond with a success. Otherwise, the memory device will not update the public key and respond with a failure.

In contrast to existing systems, during manufacturing, the embodiments reduce the chance of error, therefore, reducing the cost of manufacturing and debugging. When a customer writes a new public key using the embodiments, it likewise can reduce the chance of error, and therefore, reduce the cost, make customer support much easier and prevent rendering the memory device unusable.

In some aspects, the techniques described herein relate to a system including: a memory device including a key storage area storing a device public key and a device private key; a key management server (KMS) configured to receive a unique device secret (UDS) request, generate a UDS in response to the UDS request, compute a hash using the UDS, and return the hash and a KMS public key corresponding to the KMS private key in response to the key request; and a manufacturer computing device configured to receive the KMS public key and the hash as part of the response to the UDS request and issue a command including the KMS public key and the hash to the memory device, wherein the memory device is configured to compute a local UDS using the KMS public key and the device private key, compute a local UDS hash using the local UDS, compare the local UDS hash to the hash, and write the KMS public key to the key storage area when the local UDS hash matches the hash.

In some aspects, the techniques described herein relate to a system, wherein the UDS request includes the device public key and the KMS is configured to generate the UDS using the device public key and a KMS private key.

In some aspects, the techniques described herein relate to a system, wherein the KMS is configured to generate the UDS using a Diffie-Hellman protocol.

In some aspects, the techniques described herein relate to a system, wherein the KMS is configured to generate the UDS using an Elliptic Curve Diffie-Hellman protocol.

In some aspects, the techniques described herein relate to a system, wherein the manufacturer is configured to cache the KMS public key in response to the UDS request.

In some aspects, the techniques described herein relate to a system, wherein the manufacturer computing device is further configured to detect a failure response associated with the command, request a second UDS hash from the KMS in response to the failure response, and issue a second command including the KMS public key and the second UDS hash.

In some aspects, the techniques described herein relate to a system further including a customer computing device, the customer computing device configured to: read the device public key; generate a customer UDS (CUDS) using the device public key; generate a second hash using the CUDS; issue a second command including the second hash and a customer public key to the memory device; and wherein the memory device is configured to generate a second local UDS using the customer public key and the device private key, compute a second local UDS hash using second local UDS, compare the second local UDS hash to the second hash, and write the customer public key to the key storage area if the second local UDS hash is equal to the second hash.

In some aspects, the techniques described herein relate to a system, wherein the customer computing device is further configured to include a signature in the second command.

In some aspects, the techniques described herein relate to a system, wherein writing the customer public key to the key storage area includes overwriting an existing public key.

In some aspects, the techniques described herein relate to a system, wherein generating a CUDS using the device public key includes using a key exchange protocol to compute the CUDS using the device public key and a customer private key.

In some aspects, the techniques described herein relate to a system, wherein the memory device is further configured to determine that the local UDS hash does not match the hash and, in response, not write the KMS public key to the key storage area.

In some aspects, the techniques described herein relate to a system, wherein the memory device returns a failure response in response to determining that the local UDS hash does not the hash.

In some aspects, the techniques described herein relate to a method including: receiving, by a memory device, a command, the command including a public key and a hash of a unique device secret (UDS); generating, by the memory device, a local UDS using the public key and a locally stored private key; generating, by the memory device, a local UDS hash by inputting the local UDS into a hashing algorithm; determining, by the memory device, whether the local UDS hash matches the hash included in the command; writing, by the memory device, the public key to a key storage area if the local UDS hash matches the hash included in the command; and returning, by the memory device, a failure response if the local UDS hash does not match the hash included in the command.

In some aspects, the techniques described herein relate to a method, wherein determining whether the local UDS hash matches the hash included in the command includes determining if the local UDS hash is equal to the hash included in the command.

In some aspects, the techniques described herein relate to a method, wherein writing the public key to a key storage area includes overwriting an existing key stored in the key storage area.

In some aspects, the techniques described herein relate to a method, wherein returning a failure response includes returning failure response data as part of the failure response.

In some aspects, the techniques described herein relate to a non-transitory computer-readable storage medium for tangibly storing computer program instructions capable of being executed by a computer processor in a memory device, the computer program instructions defining steps of: receiving, by the memory device, a command, the command including a public key and a hash of a unique device secret (UDS); generating, by the memory device, a local UDS using the public key and a locally stored private key; generating, by the memory device, a local UDS hash by inputting the local UDS into a hashing algorithm; determining, by the memory device, whether the local UDS hash matches the hash included in the command; writing, by the memory device, the public key to a key storage area if the local UDS hash matches the hash included in the command; and returning, by the memory device, a failure response if the local UDS hash does not match the hash included in the command.

In some aspects, the techniques described herein relate to a non-transitory computer-readable storage medium, wherein determining whether the local UDS hash matches the hash included in the command includes determining if the local UDS hash is equal to the hash included in the command.

In some aspects, the techniques described herein relate to a non-transitory computer-readable storage medium, wherein writing the public key to a key storage area includes overwriting an existing key stored in the key storage area.

In some aspects, the techniques described herein relate to a non-transitory computer-readable storage medium, wherein returning a failure response includes returning failure response data as part of the failure response.

FIG. 1 is a block diagram of a computing system according to some of the example embodiments.

The illustrated system 100 includes a memory device 102, manufacturer 104, KMS 106, and customer 108. The memory device 102, manufacturer 104, KMS 106, and customer 108 can be implemented as one or more computing devices. For example, memory device 102 may be implemented similar to computing system 600, while manufacturer 104, KMS 106, and customer 108 may be implemented as one or more computing devices such as device 700. Operational and other details of the KMS 106, manufacturer 104, memory device 102, and customer 108 are also described in connection with FIG. 2, FIG. 3, FIG. 4, and FIG. 5, respectively and those details are incorporated herein in their entirety.

In the illustrated system 100, the KMS 106 includes a request handler 112. In some implementations, the request handler 112 can include a secure Hypertext Transport Protocol (HTTP) server that can receive network requests using a secure transport layer security (TLS) protocol. One such request includes a unique device secret (UDS) request which causes the KMS 106 to generate a UDS and hash as described in more detail herein. As discussed in FIG. 2, the UDS request will include the public key of memory device 102.

In response to a key request, the request handler 112 instructs the UDS generator 110 to generate a UDS. Details of UDS generation are provided in FIG. 2 and not repeated herein. In brief, the UDS can comprise a shared secret computed using a key exchange protocol such as Diffie-Hellman (DH) or Elliptic-curve Diffie-Hellman (ECDH), the public key of memory device 102 and a private key associated with the KMS 106 and stored in, for example, key storage 114. The UDS generator 110 can persist UDSs in a secure storage area such as key storage 114. In some implementations, the key storage 114 can be a secure storage device such as a hardware security module (HSM) or similar type of device. The request handler 112 can receive the generated UDS and hash the UDS using a hash generator 116. The hash generator 116 can include any well-known hash algorithm that converts a given input to a fixed length hash value. The request handler 112 can combine a public key of the KMS (e.g., stored in key storage 114) and the UDS hash generated by hash generator 116 into a response and return the response to the calling party (e.g., manufacturer 104).

The manufacturer 104 includes a request generator 118 capable of generating and issuing a request for a KMS public key and a UDS hash from the KMS 106. As discussed in FIG. 2, the request can include various parameters controlling the UDS generation process, which are not repeated herein. Upon receiving the KMS public key and a UDS hash from the KMS 106, the request generator 118 can store the KMS public key, and optionally the UDS, in key storage 120. In some implementations, the KMS 106 may only return the UDS hash and the manufacturer 104 may reused a cached KMS public key stored in key storage 120. In such an implementation, the UDS request may include a datetime of when the KMS public key was cached to allow the KMS 106 to invalidate the cached public key and provide a new KMS public key.

As with key storage 114, the key storage 120 can comprise an HSM or similar device. The manufacturer 104 also includes a command generator 122, which can generate commands processible by the memory device 102. As discussed in FIG. 3, this command can be a manufacturing command that is only available when the memory device 102 is being manufactured. The command further can include the KMS public key and the UDS hash received from the KMS 106. The manufacturer 104 can communicate with the memory device 102 via a command interface 124, which can comprise (for example) a serial peripheral interface (SPI), universal asynchronous receiver-transmitter (UART) interface, peripheral component interconnect express (PCIe), wireless fidelity (Wi-Fi), Ethernet, or another type of interface. As discussed in FIG. 3, the manufacturer 104 issues a command to write a KMS public key to the memory device 102 and awaits a response. Based on the response, manufacturer 104 can determine whether the KMS public key was written or if remedial measures should be taken.

The memory device 102 includes a command interface 126 corresponding to the command interface 124. The memory device 102 receives commands over the command interface 126, including the command to write a public key (either from the KMS 106 or from customer 108). In response to such a command, a UDS generator 142 can compute a local UDS using the received public key (e.g., KMS or customer public key) and a locally stored private key using, for example, a DH or ECDH protocol. The UDS generator 142 can transmit the local UDS to a hash generator 128 which generates a hash of the local UDS. A comparator 130 then compares the local UDS hash to the hash received in the command. If the two hashes match (e.g., are equal), the memory device 102 can write the received public key to a key storage area 132 of the memory device 102 (e.g., an HSM). In some scenarios, this write can result in overwriting an existing key. The memory device 102 is then further able to return a response to the memory device 102 (or customer 108) based on the command indicating whether the write was performed and successful or whether a failure occurred.

The illustrated system 100 can also include a customer 108 that can write their own public key to the memory device 102. Customer 108 includes a UDS generator 134, which functions similarly to UDS generator 110 to generate a CUDS. In some implementations, the algorithm used by UDS generator 134 is the same as that used by UDS generator 110; however, this is not required. After generating an asymmetric key pair, customer 108 can store the key pair in key storage 136 (e.g., an HSM). Customer 108 also can generate a command via the command generator 138, which operates similar to command generator 122. The customer 108 can further hash the CUDS generated by UDS generator 110 and the command generator 138 can include this hash of the CUDS along with the customer public key retrieved from key storage 136 (or otherwise generated by the customer 108). Command generator 138 differs from command generator 122 in that it can only generate valid commands after manufacturing. In some implementations, these commands can include a replace key command that allows the customer 108 to replace a key. In some implementations, the replace key command can be signed by the KMS 106 using a private key corresponding to a public key stored in key storage area 132. Customer 108 can issue the command to the memory device via a command interface 140 and await a success or failure response. Upon successful response, the memory device 102 will update its key with the key generated by customer 108. Further details of the operations of customer 108 are provided in the description of FIG. 5 which are not repeated herein.

Figure 2:
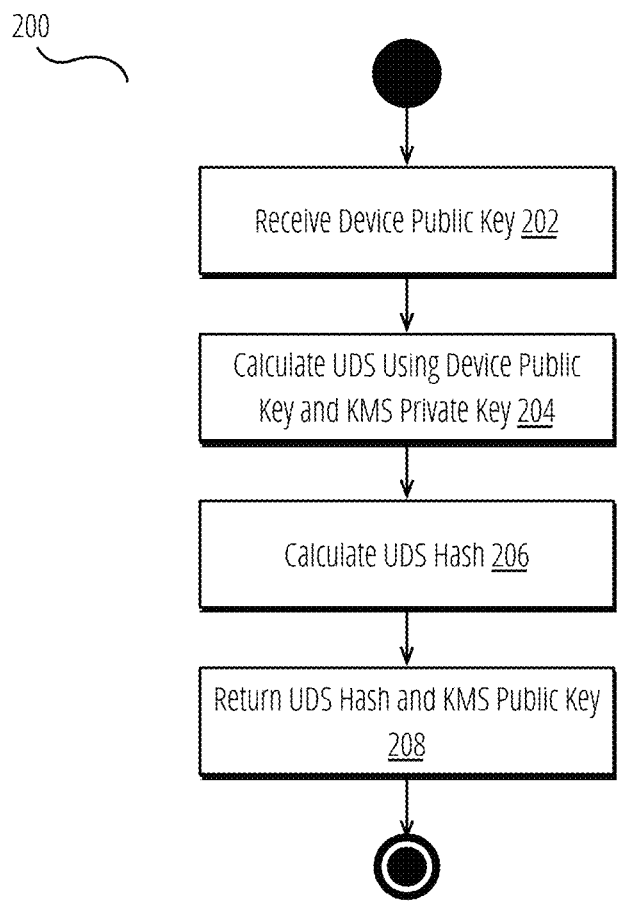
FIG. 2 is a flow diagram illustrating a method for generating a unique device secret (UDS) for a secure memory device according to some of the example embodiments.

FIG. 2 is a flow diagram illustrating a method for generating a UDS for a secure memory device according to some of the example embodiments. A KMS (such as KMS 106 in FIG. 1) may execute method 200. The description of method 200 provided below is provided in the context of a single UDS; however, method 200 is not limited as such, and references to a single UDS apply equally to scenarios where multiple UDSs are involved.

In step 202, method 200 can include receiving a public key of a memory device. In some implementations, method 200 can receive the public key as part of a UDS request issued by a manufacturer or customer to a KMS. In some implementations, the form of the public key may not be limiting. In general, and as will be discussed, the KMS may utilize a Diffie-Hellman (DH) or Elliptic Curve Diffie-Hellman (ECDH) key exchange protocol, and thus the public key format may be selected for use with such protocols. While elliptic curve cryptography (ECC) keys, such as Elliptic Curve Digital Signature Algorithm (ECDSA) keys, and an ECDH key exchange protocol are used in the following description, the principles apply equally to non-elliptic curve keys used in, for example, a DH key exchange system.

A manufacturer or customer may generate and issue the UDS request. Method 200 can receive the UDS request via, for example, a secure network interface (e.g., secure Hypertext Transport Protocol request). In some implementations, a user or device submitting a UDS request may be authenticated prior to method 200 executing. For example, a user or manufacturer may authenticate to the device executing method 200 via a login or other type of authentication mechanism, which is non-limiting. The UDS request can include parameters describing the request, such as the intended use of the UDS, generation algorithm type, etc., all of which are non-limiting. Alternatively, the UDS request can include no such parameters, and the device executing method 200 can operate using default parameters.

In step 204, method 200 can include generating a UDS in response to the UDS request.

In a Device Identity Composition Engine (DICE) architecture, a UDS is a unique value that can be assigned to a computing device (e.g., a secure memory). In general, a UDS is uncorrelated and statistically unique to a given device. The UDS may then be used to form higher layer keys in a chained manner. Thus, the UDS represents a root of trust within a DICE architecture. Many systems rely on hardware mechanisms to establish a UDS. For example, a physically unclonable function (PUF) can be used either as the UDS directly or as an input to a one-way hash function (OWF) that can generate a repeatable UDS. Such approaches can guarantee reasonable uniqueness but also are limited in that they are dependent on the physical properties of the underlying device.

By contrast, in step 204, a software-defined UDS is generated. In an implementation, step 204 includes performing a key exchange protocol to generate the UDS, such as DH or ECDH protocol. In this protocol, method 200 uses the public key received in step 204 and its own private key stored by the operator of method 200 (e.g., the KMS). In a key exchange protocol, a shared secret is calculated using the memory device's public key and the private key. In an implementation, this shared secret is used as the UDS. Further, based on the principles of cryptographic key exchange protocols, the exact same UDS can be computed using the memory device's private key and the KMS public key. Given that either the KMS private key or the memory device private key must be used to generate the shared secret (i.e., UDS), it can be cryptographically guaranteed that only the holder of one of these private keys can generate the UDS, thus ensuring that only the KMS and memory device can generate a UDS (barring malicious or accidental exposure of private keys).

In step 206, method 200 can include computing a hash of the UDS.

In some implementations, method 200 can compute the hash using the UDS as the input to the hashing algorithm. The choice of hashing algorithm is non-limiting and any algorithm that can generate a suitably unique digest output can be used. For example, step 206 can use a SHA-256, SHA-384, SHA-512, SHA3-224, SHA3-256, SHA3-384, SHA3-512, BLAKE2, BLAKE2s, BLAKE2b, RIPEMD-160, or Keccak-256 algorithm. In general, a hash function will convert an input (i.e., the UDS) into a fixed-length output that provides high collision avoidance with other outputs. In some algorithms, the hash function may also take a desired output length as a parameter and, if so, method 200 can utilize a suitable output length (which is non-limiting).

In step 208, method 200 can include returning the public key of the operator of method 200 and the hash generated in step 206 as a response to the UDS request.

The returned key in step 208 comprises the public key of the device executing method 200. In an implementation, the public key is a public key of the KMS (i.e., the public key corresponding to a private key used to generate the UDS). In some implementations, the response includes a UDS hash generated in step 206. In other implementations, when UDSs are generated, the response can be represented as a dictionary or map structure mapping device public keys to hashes. Other data structures may be used. Method 200 can transmit the hash(es) as a response to the UDS request received in step 202. Thus, as one example, the response can be an HTTPS response to an HTTP request including the UDS request. Other network protocols may be used.

In some implementations, method 200 can optionally include storing the UDS, device public key, and hash after step 208. In most implementations, the device executing method 200 may only store the device public key in step 202. This is because the UDS and hash of the UDS can all be re-generated on demand using the operator's private key (as discussed above). Thus, storing of UDS and UDS hashes may be unnecessary (and in some circumstances, a security risk). In some implementations, method 200 can nevertheless still store the UDS and hash values generated in step 204 and step 206 respectively.

In the foregoing method 200, a KMS (or other device) executing method 200 can thus manage all UDSs and corresponding hashes on behalf of requesting users (e.g., manufacturers). As will be discussed next, these hashes can be used to validate the public key of the KMS executing method 200 (or a customer, as will be described).

Figure 3:
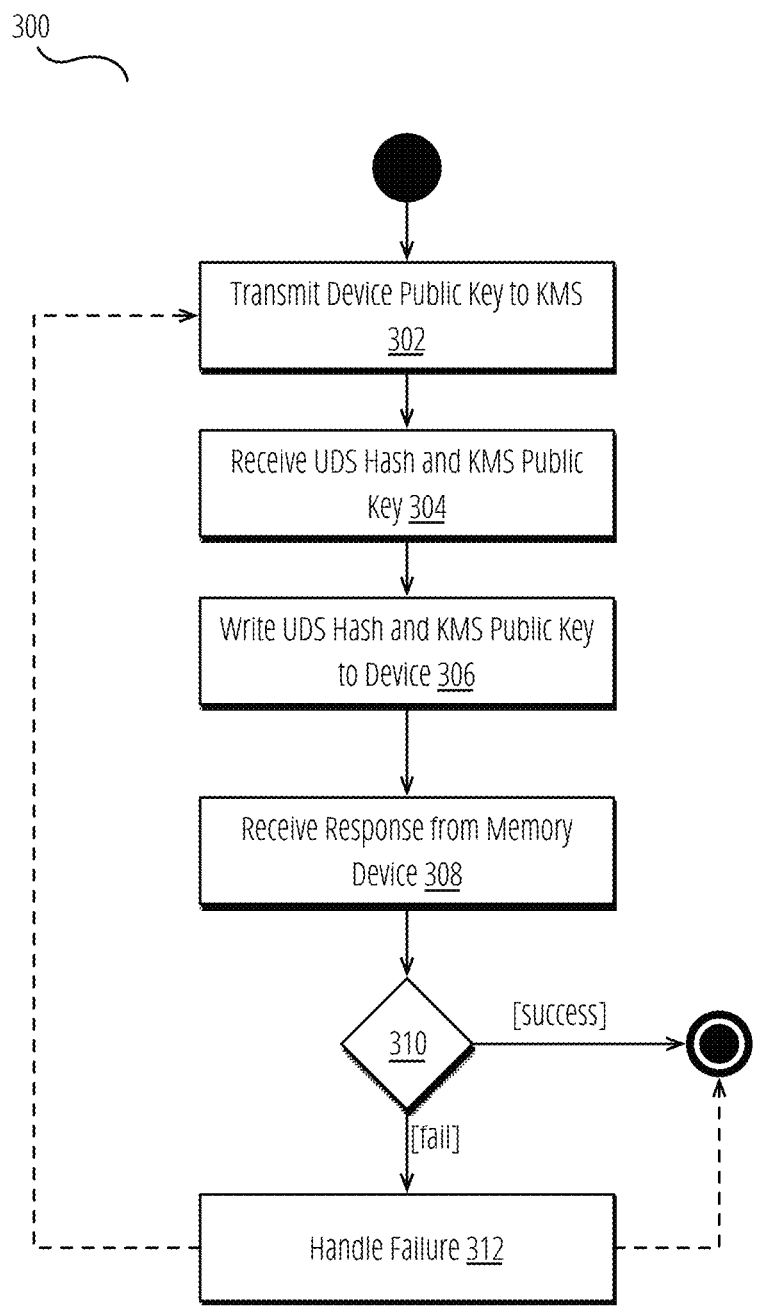
FIG. 3 is a flow diagram illustrating a method for programming a cryptographic key in a secure memory device according to some example embodiments.

FIG. 3 is a flow diagram illustrating a method for programming a cryptographic key in a secure memory device according to some example embodiments. A manufacturer computing device (such as manufacturer 104 in FIG. 1) may execute method 300. The description of method 300 provided below is provided in the context of a single key and a single memory device; however, method 300 is not limited as such and references to a single key or memory device apply equally to scenarios where multiple keys or memory devices are involved.

In step 302, method 300 can include issuing a UDS request to a KMS and, in step 304, receiving the public key of the KMS and a hash of the generated UDS from the KMS in response. Details of this UDS request were provided in the description of FIG. 2 and are not repeated herein. In some implementations, step 302 can include reading the public key from the memory device prior to transmitting the request. In other implementations, the public key can be read from a database of recorded public keys associated with the memory device.

In step 306, method 300 can include issuing a command to a memory device, the command including the KMS public key and the UDS hash. In an implementation, the command can be a manufacturer's command that is only capable of being issued while the memory device is possessed by the manufacturer. Such a command may be replaced with a NOOP command once the memory device is released from manufacturing. Specifically, in step 306, the memory device may not include any cryptographic keys and thus the command issued in step 306 may only be enabled in a secure environment and then removed from the instruction set of the memory device.

In step 308, method 300 can include receiving a response from the memory device. The response may be a success or failure response indicating whether the command was successful. In some implementations, the command is successful if the memory device has written the KMS public key in the command from step 306 (including both new writes as well as overwriting an existing key). In some implementations, a command fails if the memory device does not write the KMS public key for some reason. As discussed more in FIG. 4, one such reason is that the hash cannot be validated. Other reasons may also raise failures, including command malformation, key length errors, etc.

In step 310, method 300 can include determining which type of response was received: success or failure. If method 300 receives a successful response from the memory device, method 300 ends as the memory device has successfully written the KMS public key provided in step 306. By contrast, if the command issued in step 306 fails, method 300 proceeds to step 312.

In step 312, method 300 can include handling a failure response to the command issued in step 306. As discussed above, a failure can arise under many conditions, however one such condition is that the hash provided in the command cannot be validated. As will be discussed in FIG. 4, the memory device recomputes its own hash to confirm that the data it has received is valid. If this comparison fails, the command fails and a failure response is transmitted.

When faced with a failure state, method 300 may take various actions. FIG. 3 illustrates two such alternative paths in dashed lines. In one implementation, method 300 can simply terminate. In actual implementation, method 300 may include displaying an error message (or another indicator) to a human operator to indicate that the command failed. Ultimately, the choice of user interface may be left to the implementation of method 300. In general, however, this option represents an attempt to write the KMS public key and then prompt for assistance if the key fails. As another alternative, method 300 can attempt to perform various corrections on the current key and re-execute. For example, method 300 can change the Endianness of the key and re-execute. Such common errors may be enumerated and method 300 re-executed for each type of error.

By contrast, in another implementation, method 300 may immediately return to step 302 and effectively re-execute itself. That is, method 300 can request another KMS public key and UDS hash from the KMS and attempt to write the new KMS public key and UDS hash to the memory device. In some implementations, method 300 can re-execute like this until a successful response is received. However, in other implementations, method 300 may only re-execute itself a limited number of times. For example, method 300 may only attempt to request a new KMS public key and write this new KMS public key five times. Generally, sporadic errors in the KMS public key or UDS hash are likely caused by corruption during network transmission or command transmissions and are very unlikely. Thus, in practice, method 300 may only need re-execute once to successfully write the KMS public key. However, if repeated errors occur, such errors may be caused by more fundamental errors in the process (e.g., Endianness errors). In such a scenario, part of the foregoing processes of FIGS. 2 and 3 (and, as will be discussed, FIG. 4) includes a bug or other flaw that needs to be addressed. As such, method 300 may only re-execute a fixed number of times before ending (and alerting a user of a potential fault in the system).

Figure 4:
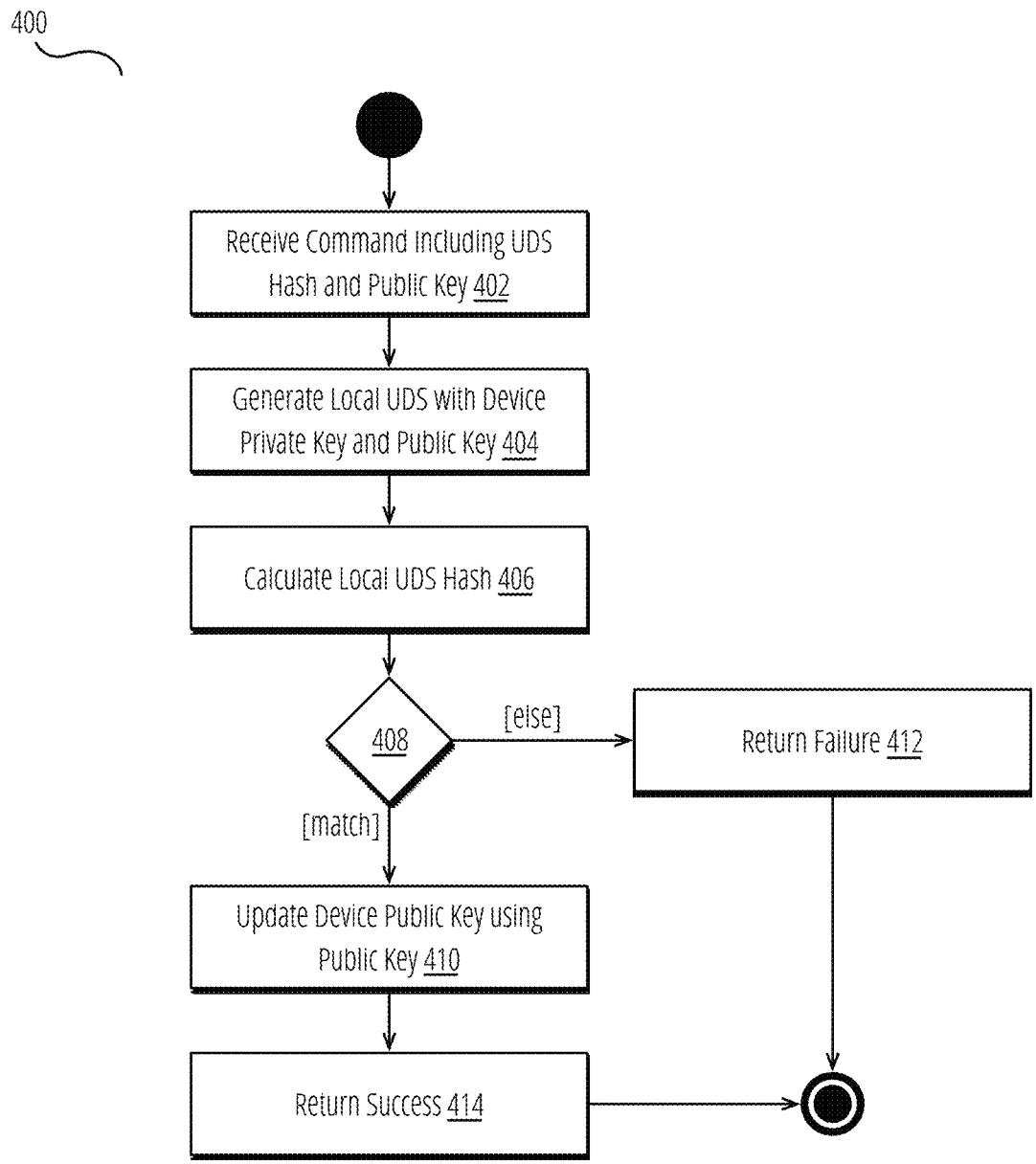
FIG. 4 is a flow diagram illustrating a method for validating a cryptographic key by a secure memory device according to the example embodiments.

FIG. 4 is a flow diagram illustrating a method for validating a cryptographic key by a secure memory device according to the example embodiments. A memory device (such as memory device 102 in FIG. 1) may execute method 400. The description of method 400 provided below is provided in the context of a single key, however, method 400 is not limited as such and references to a single key apply equally to scenarios where multiple keys are involved.

In step 402, method 400 can include receiving a command, the command including a public key (e.g., a KMS public key) and a hash of a UDS value. In one scenario, method 400 receives the command from a manufacturer computing device (as described in FIG. 3). In another scenario, method 400 receives the command from a customer computing device (as will be discussed in FIG. 5). In some implementations, if the public key is received from the manufacturer it may be the KMS public key. In other implementations, if the public key is received from a customer it may be a public key of the customer. Details of the public key and hash have been described previously and are not repeated herein.

In step 404, method 400 can include generating a local UDS using a device private key and the public key received in step 402. As discussed in FIG. 2, a DH, ECDH, or similar key exchange protocol can be implemented on the memory device (as it is in the KMS) to compute a shared secret using private and public keys belong to different key pairs.

This shared secret, recomputed locally on the memory device, can be the local UDS. In one scenario, the public key can be the KMS public key used in FIG. 2 to compute the UDS and corresponding hash. In another scenario, discussed in FIG. 5, the public key can be a customer's own public key used to compute a customer UDS (CUDS) and corresponding hash. In both scenarios, however, the private key is the private key stored locally by the memory device (corresponding to an active public key).

In step 406, method 400 can include calculating a local hash of the local UDS (referred to as the local UDS hash). In this step, method 400 independently computes a hash of the local UDS using the UDS generated in step 404. No limitation is placed on the type of hashing algorithm, as discussed in FIG. 2. However, in most implementations, the hashing algorithm used in step 406 should match the hashing algorithm used in step 206 of FIG. 2.

In step 408, method 400 can include comparing the local UDS hash and the UDS hash received in the command received in step 402 (referred to as the received UDS hash). In general, the comparison includes a strict comparison to determine if the local UDS hash and the received UDS hash are bytewise identical.

In step 408, method 400 can include determining whether the local UDS hash and the received UDS hash are indeed identical or otherwise matching (the disclosure does not foreclose systems that rely on fuzzy matching between hashes).

If method 400 determines that the local UDS hash and received UDS hash do not match (e.g., are not equal), method 400 can, in step 412, return a failure to the device that issued the command of step 402. In some implementations, the failure can comprise a flag or other data structure indicating a failure. In other implementations, the memory device can attempt to provide further failure response data regarding the failure. In general, the memory device only has access to two hashes: the local UDS hash and received UDS hash. Thus, the memory device may be limited in the detail of error messages provided. However, the memory device can still provide useful information that can be used by the calling party. For example, the memory device can provide the two number of unmatching bits between the two hashes. If a local UDS hash is computed on a different input than the received UDS hash, this value will be high, frequently most or all of the bits. By contrast, if the received UDS hash was malformed during transmission, only a few bits may be mismatched. In response, a calling party can make decisions on how best to retry (as discussed).

If, in step 408, method 400 determines that the local UDS hash and the received UDS hash match (e.g., are equal), method 400 proceeds to step 410 where the public key received in the command received in step 402 is written to the memory device. In some implementations, the public key can be written to a secure key storage area of the memory device and subsequently used for cryptographic operations performed by the memory device (e.g., signature validation). In some scenarios, the writing of the public key can include overwriting an existing public key. In such a scenario, the overwriting of a public key may operate as an ownership transfer of the device (since only the owner of the private key can sign data that can be validated by the memory device). Finally, after writing a public key to the key storage area, method 400 returns a success response in step 414, indicating that the write was successful.

Figure 5:
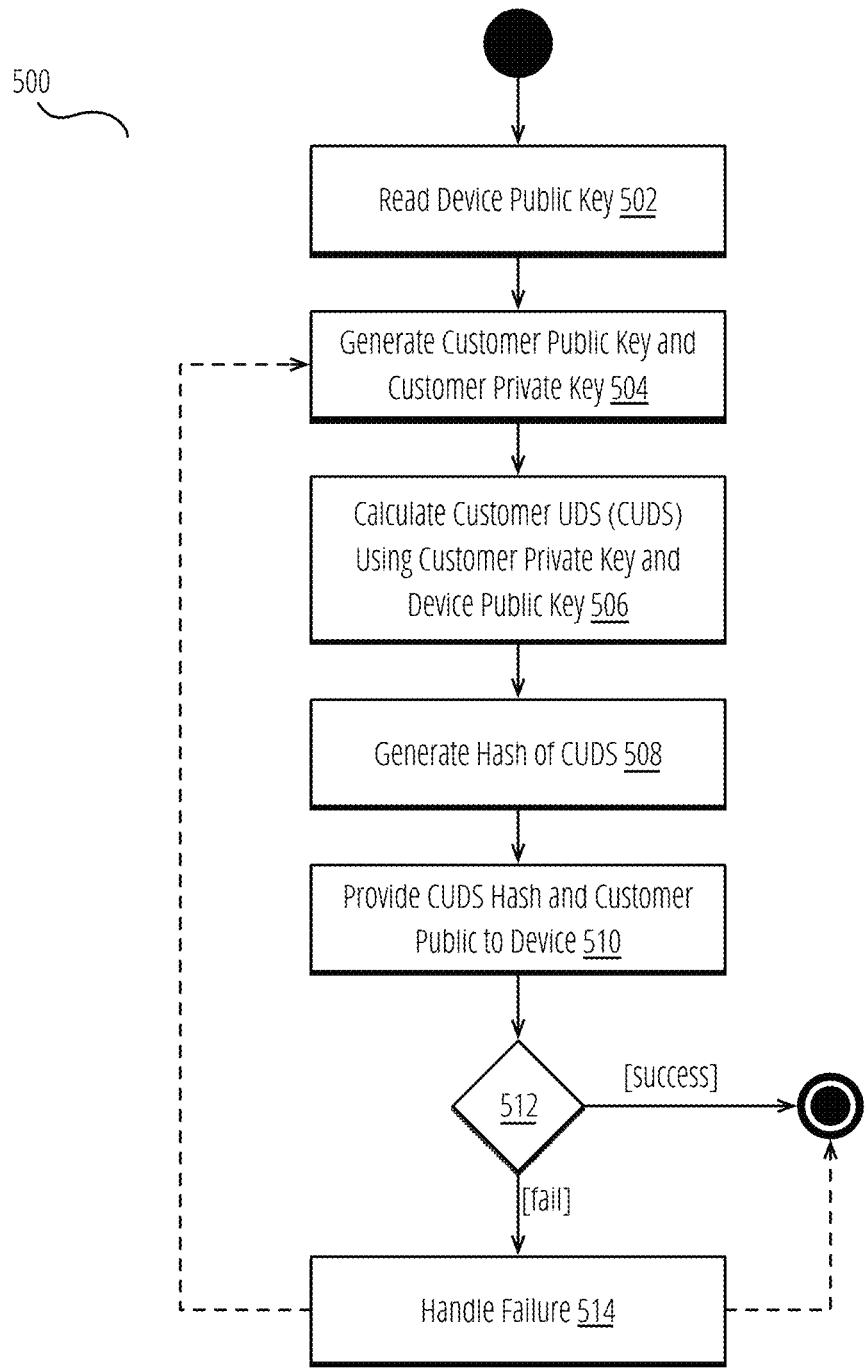
FIG. 5 is a flow diagram illustrating a method for programming a customer's cryptographic key in a secure memory device according to some example embodiments.

FIG. 5 is a flow diagram illustrating a method for programming a customer's cryptographic key in a secure memory device according to some example embodiments. A customer computing device (such as customer 108 in FIG. 1) may execute method 500. The description of method 500 provided below is provided in the context of a single key and a single memory device, however method 500 is not limited as such and references to a single key or memory device apply equally to scenarios where multiple keys or memory devices are involved.

In step 502, method 500 can include reading a public key of a memory device. In some implementations, a memory device can support a command that allows an external device to read a public key of the memory device. Thus, a customer computing device can issue such a command and receive the current public key of the memory device. In some implementations, the command can include a flag specifying which public key from a set of public keys to retrieve. For example, a memory device can include multiple public keys that the memory device uses for different purposes. Each of these public keys can be associated with an identifier, and the command can include a corresponding identifier. The specific type of the public key is not limiting; however, it can generally be a public key that can be used in a key exchange protocol such as a DH or ECDH protocol.

In step 504, method 500 can include generating an asymmetric key pair. As illustrated, this asymmetric key pair includes a customer public key and a customer private key that are generated by the customer (e.g., by the customer computing device). In general, the type of asymmetric key pair generated in step 504 will be compatible with the public key received from the memory device. That is, the asymmetric key pair the customer generates must be useable in an agreed-upon key exchange protocol.

In step 506, method 500 can include calculating a customer UDS (CUDS) using the public key of the memory device and the customer private key.

As discussed in step 204, a software-defined CUDS is generated in step 506. In an implementation, step 506 includes performing a key exchange protocol to generate the UDS, such as DH or ECDH protocol. In this protocol, method 500 uses the public key received in step 502 and the customer private key stored generated in step 504. In a key exchange protocol, a shared secret is calculated using the memory device's public key and the customer private key. In an implementation, this shared secret is used as the CUDS. Further, based on the principles of cryptographic key exchange protocols, the exact same CUDS can be computed using the memory device's private key and the customer public key (as will be discussed). Given that either the customer private key or the memory device private key must be used to generate the shared secret (i.e., CUDS), it can be cryptographically guaranteed that only the holder of one of these private keys can generate the CUDS, thus ensuring that only the customer and memory device can generate a CUDS (barring malicious or accidental exposure of private keys).

In step 508, method 500 can include generating a hash of the CUDS.

In an implementation, step 508 can include computing the hash using the CUDS as the input to the hashing algorithm. The choice of hashing algorithm is non-limiting and any algorithm that can generate a suitably unique digest output can be used. For example, step 508 can use a SHA-256, SHA-384, SHA-512, SHA3-224, SHA3-256, SHA3-384, SHA3-512, BLAKE2, BLAKE2s, BLAKE2b, RIPEMD-160, or Keccak-256 algorithm. In general, a hash function will convert an input (i.e., the key) into a fixed-length output that provides high collision avoidance with other outputs. In some algorithms, the hash function may also take a desired output length as a parameter and, if so, step 508 can utilize a suitable output length (which is non-limiting).

Notably, in method 500, a customer generates its own keys and thus is charged with maintaining the security of such data. For example, as described in FIG. 2, the customer can store the keys and (if needed) hashes in an HSM or other type of secure key storage area.

In step 510, method 500 can include issuing a command to a memory device, the command including the customer's public key and hash generated from the CUDS. In an implementation, the command can be a dedicated command for writing a key to the memory device. In some implementations, the command (and data thereto) must be signed by the current owner of the key stored in the memory device. For example, the command must be signed by the holder of a private key corresponding to the public key stored in the memory device. As an example, if the current public key of the memory device was generated by a KMS (as described in FIG. 2), the customer must first obtain a signature for the command by the KMS (which is generated using the KMS's private key). The customer can authenticate to the KMS (and provide a device identifier of the memory device), provide the command, and receive this signature. In some implementations, the KMS can be configured to manage the customer's keys and thus can persist the customer-generated public key (and optional CUDS hash) in its own HSM or similar storage module. Details on the operations performed by the memory device in response to the command issued in step 510 were provided in FIG. 4 and are not described herein.

In step 512, method 500 can include receiving a response from the memory device. The response may be a success or failure response indicating whether the command was successful. In some implementations, the command is successful if the memory device has written the key in the command from step 510 (including both new writes as well as overwriting an existing key). In some implementations, a command fails if the memory device does not write the key for some reason. As discussed more in FIG. 4, one such reason is that the hash cannot be validated. Other reasons may also raise failures including command malformation, key length errors, etc.

In step 512, method 500 further includes determining which type of response was received: success or failure. If method 500 receives a successful response from the memory device, method 500 ends as the memory device has successfully written the key provided in step 510. By contrast, if the command issued in step 510 fails, method 500 proceeds to step 514.

In step 514, method 500 can include handling a failure response to the command issued in step 510. As discussed above, a failure can arise under many conditions, however one such condition is that the hash provided in the command cannot be validated. As discussed in FIG. 4, the memory device recomputes its own hash to confirm that the CUDS it has received is valid. If this comparison fails, the command fails, and a failure response is transmitted. As another alternative, method 500 can attempt to perform various corrections on the current key and re-execute. For example, method 500 can change the Endianness of the key and re-execute. Such common errors may be enumerated and method 500 re-executed for each type of error.

When faced with a failure state, method 500 may take various actions. FIG. 5 illustrates two such alternative paths in dashed lines. In one implementation, method 500 can simply terminate. In actual implementation, method 500 may include displaying an error message (or another indicator) to the customer to indicate that the command failed. Ultimately, the choice of user interface may be left to the implementation of method 500. In general, however, this option represents an attempt to write the key and then prompt for assistance if the key fails.

By contrast, in another implementation, method 500 may immediately return to step 504 (or step 502, if there is concern that the device public key was malformed, or step 506, if it is presumed the customer generated a valid key) and effectively re-execute itself. That is, method 500 can generate another CUDS and hash and attempt to write the new customer public key to the memory device. In some implementations, method 500 can re-execute like this until a successful response is received. However, in other implementations, method 500 may only re-execute itself a limited number of times. For example, method 500 may only attempt to request a new CUDS and write the customer public key five times. Generally, sporadic errors in the key or hash are likely caused by corruption during network transmission or command transmissions and are very unlikely. Thus, in practice, method 500 may only need re-execute once to successfully write a key. However, if repeated errors occur, such errors may be caused by more fundamental errors in the process (e.g., Endianness errors). In such a scenario, part of the foregoing processes of FIG. 2 through FIG. 4 includes a bug or other flaw that needs to be addressed. As such, method 500 may only re-execute a fixed number of times before ending (and alerting a user of a potential fault in the system).

Figure 6:
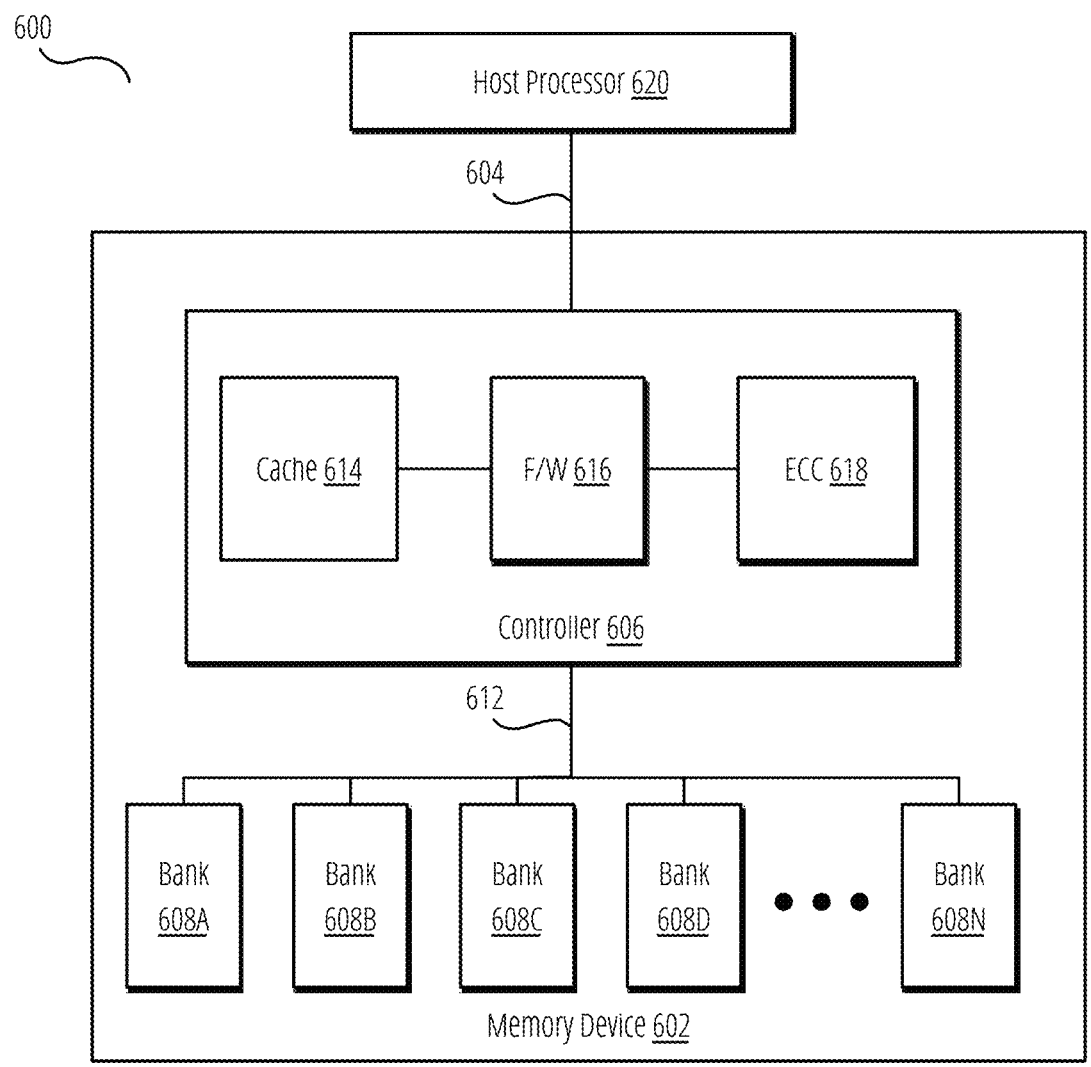
FIG. 6 is a block diagram illustrating a computing system according to some embodiments of the disclosure.

FIG. 6 is a block diagram illustrating a computing system according to some embodiments of the disclosure.

As illustrated in FIG. 6, a computing system 600 includes a host processor 620 communicatively coupled to a memory device 602 via a bus 604. The memory device 602 comprises a controller 606 communicatively coupled to one or more memory banks (e.g., bank 608A, bank 608B, bank 608C, bank 608D, bank 608N, etc.) forming a memory array via an interface 612. As illustrated, the controller 606 includes a local cache 614, firmware 616, and an ECC module 618.

In the illustrated embodiment, host processor 620 can comprise any type of computer processors, such as a central processing unit (CPU), graphics processing unit (GPU), or other types of general-purpose or special-purpose computing devices. The host processor 620 includes one or more output ports that allow for the transmission of address, user, and control data between the host processor 620 and the memory device 602. In the illustrated embodiment, this communication is performed over bus 604. In one embodiment, the bus 604 comprises an input/output (I/O) bus or a similar type of bus.

The memory device 602 is responsible for managing one or more memory banks (e.g., bank 608A, bank 608B, bank 608C, bank 608D, bank 608N, etc.). In one embodiment, the memory banks (e.g., bank 608A, bank 608B, bank 608C, bank 608D, bank 608N, etc.) comprise NAND Flash dies or other configurations of non-volatile memory. In one embodiment, the memory banks (e.g., bank 608A, bank 608B, bank 608C, bank 608D, bank 608N, etc.) comprise a memory array.

The memory banks (e.g., bank 608A, bank 608B, bank 608C, bank 608D, bank 608N, etc.) are managed by the controller 606. In some embodiments, the controller 606 comprises a computing device configured to mediate access to and from banks (e.g., bank 608A, bank 608B, bank 608C, bank 608D, bank 608N, etc.). In one embodiment, the controller 606 comprises an ASIC or other circuitry installed on a printed circuit board housing the memory banks (e.g., bank 608A, bank 608B, bank 608C, bank 608D, bank 608N, etc.). In some embodiments, the controller 606 may be physically separate from the memory banks (e.g., bank 608A, bank 608B, bank 608C, bank 608D, bank 608N, etc.). The controller 606 communicates with the memory banks (e.g., bank 608A, bank 608B, bank 608C, bank 608D, bank 608N, etc.) over the interface 612. In some embodiments, this interface 612 comprises a physically wired (e.g., traced) interface. In other embodiments, interface 612 comprises a standard bus for communicating with memory banks (e.g., bank 608A, bank 608B, bank 608C, bank 608D, bank 608N, etc.).

The controller 606 comprises various modules, including local cache 614, firmware 616, and ECC module 618. In one embodiment, the various modules (e.g., local cache 614, firmware 616, and ECC module 618) comprise various physically distinct modules or circuits. In other embodiments, the modules (e.g., local cache 614, firmware 616, and ECC module 618) may completely (or partially) be implemented in software or firmware.

As illustrated, firmware 616 comprises the core of the controller and manages all operations of the controller 606. The firmware 616 may implement some or all of the methods described above. Specifically, firmware 616 may implement the methods described in the foregoing figures.

Figure 7:
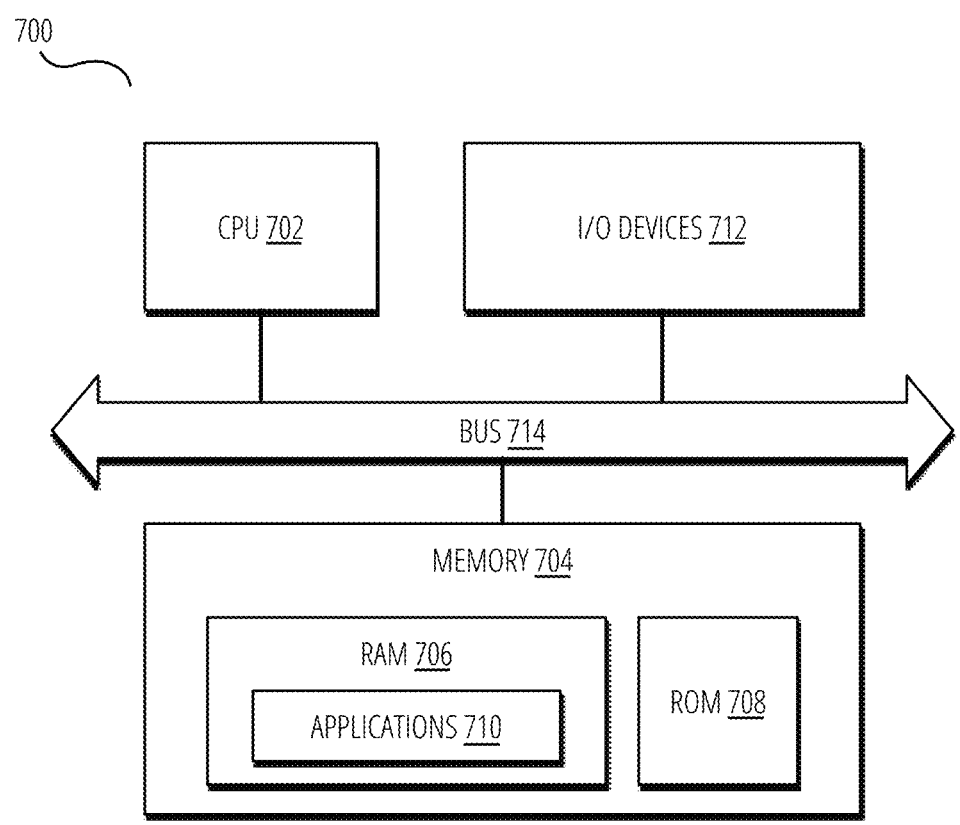
FIG. 7 is a block diagram of a computing device according to some embodiments of the disclosure.

FIG. 7 is a block diagram of a computing device according to some embodiments of the disclosure.

As illustrated, the device 700 includes a processor or central processing unit (CPU) such as CPU 702 in communication with a memory 704 via a bus 714. The device also includes one or more input/output (I/O) or peripheral devices 712. Examples of peripheral devices include, but are not limited to, network interfaces, audio interfaces, display devices, keypads, mice, keyboards, touch screens, illuminators, haptic interfaces, global positioning system (GPS) receivers, cameras, or other optical, thermal, or electromagnetic sensors.

In some embodiments, the CPU 702 may comprise a general-purpose CPU. The CPU 702 may comprise a single-core or multiple-core CPU. The CPU 702 may comprise a system-on-a-chip (SoC) or a similar embedded system. In some embodiments, a graphics processing unit (GPU) may be used in place of, or in combination with, a CPU 702. Memory 704 may comprise a memory system including a dynamic random-access memory (DRAM), static random-access memory (SRAM), Flash (e.g., NAND Flash), or combinations thereof. In one embodiment, the bus 714 may comprise a Peripheral Component Interconnect Express (PCIe) bus. In some embodiments, bus 714 may comprise multiple busses instead of a single bus.

Memory 704 illustrates an example of a non-transitory computer storage media for the storage of information such as computer-readable instructions, data structures, program modules, or other data. Memory 704 can store a basic input/output system (BIOS) in read-only memory (ROM), such as ROM 708, for controlling the low-level operation of the device. The memory can also store an operating system in random-access memory (RAM) for controlling the operation of the device.

Applications 710 may include computer-executable instructions that, when executed by the device, perform any of the methods (or portions of the methods) described previously in the description of the preceding figures. In some embodiments, the software or programs implementing the method embodiments can be read from a hard disk drive (not illustrated) and temporarily stored in RAM 706 by CPU 702. CPU 702 may then read the software or data from RAM 706, process them, and store them in RAM 706 again.

The device may optionally communicate with a base station (not shown) or directly with another computing device. One or more network interfaces in peripheral devices 712 are sometimes referred to as a transceiver, transceiving device, or network interface card (NIC).

An audio interface in peripheral devices 712 produces and receives audio signals such as the sound of a human voice. For example, an audio interface may be coupled to a speaker and microphone (not shown) to enable telecommunication with others or generate an audio acknowledgment for some action. Displays in peripheral devices 712 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 712 may comprise any input device arranged to receive input from a user. An illuminator in peripheral devices 712 may provide a status indication or provide light. The device can also comprise an input/output interface in peripheral devices 712 for communication with external devices, using communication technologies, such as USB, infrared, Bluetooth®, or the like. A haptic interface in peripheral devices 712 provides tactile feedback to a user of the client device.

A GPS receiver in peripheral devices 712 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 7, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on the context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of order. For example, two blocks shown in succession can, in fact, be executed substantially concurrently, or the blocks can sometimes be executed in the reverse order, depending upon the functionality or acts involved.

These computer program instructions can be provided to a processor of a general purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and, as such, are not to be limited by the foregoing exemplary embodiments and examples. In other words, functional elements being performed by single or multiple components, in various combinations of hardware and software or firmware, and individual functions, may be distributed among software applications at either the client level or server level, or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions, and interfaces, as well as those variations and modifications that may be made to the hardware, software, or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A system comprising:
   a memory device including a key storage area storing a device public key and a device private key;
   a key management server (KMS) configured to receive a unique device secret (UDS) request, generate a UDS in response to the UDS request, compute a hash using the UDS, and return the hash and a KMS public key corresponding to the KMS private key in response to the key request;
   a manufacturer computing device configured to receive the KMS public key and the hash as part of the response to the UDS request and issue a command including the KMS public key and the hash to the memory device, wherein the memory device is configured to compute a local UDS using the KMS public key and the device private key, compute a local UDS hash using the local UDS, compare the local UDS hash to the hash, and write the KMS public key to the key storage area when the local UDS hash matches the hash; and
   a customer computing device configured to:
      read the device public key;
      generate a customer UDS (CUDS) using the device public key;
      generate a second hash using the CUDS;
      issue a second command including the second hash and a customer public key to the memory device.

2. The system of claim 1, wherein the UDS request includes the device public key and the KMS is configured to generate the UDS using the device public key and a KMS private key.

3. The system of claim 2, wherein the KMS is configured to generate the UDS using a Diffie-Hellman protocol.

4. The system of claim 2, wherein the KMS is configured to generate the UDS using an Elliptic Curve Diffie-Hellman protocol.

5. The system of claim 1, wherein the manufacturer is configured to cache the KMS public key in response to the UDS request.

6. The system of claim 1, wherein the manufacturer computing device is further configured to detect a failure response associated with the command, request a second UDS hash from the KMS in response to the failure response, and issue a second command including the KMS public key and the second UDS hash.

7. The system of claim 1,
   wherein the memory device is configured to generate a second local UDS using the customer public key and the device private key, compute a second local UDS hash using second local UDS, compare the second local UDS hash to the second hash, and write the customer public key to the key storage area if the second local UDS hash is equal to the second hash.

8. The system of claim 7, wherein the customer computing device is further configured to include a signature in the second command.

9. The system of claim 7, wherein writing the customer public key to the key storage area comprises overwriting an existing public key.

10. The system of claim 7, wherein generating a CUDS using the device public key comprises using a key exchange protocol to compute the CUDS using the device public key and a customer private key.

11. The system of claim 1, wherein the memory device is further configured to determine that the local UDS hash does not match the hash and, in response, not write the KMS public key to the key storage area.

12. The system of claim 11, wherein the memory device returns a failure response in response to determining that the local UDS hash does not match the hash.

13. A method comprising:
- receiving, by a memory device, a command, the command including a public key and a hash of a unique device secret (UDS);
- generating, by the memory device, a local UDS using the public key and a locally stored private key;
- generating, by the memory device, a local UDS hash by inputting the local UDS into a hashing algorithm;
- determining, by the memory device, whether the local UDS hash matches the hash included in the command;
- writing, by the memory device, the public key to a key storage area if the local UDS hash matches the hash included in the command; and
- returning, by the memory device, a failure response if the local UDS hash does not match the hash included in the command,
- wherein determining whether the local UDS hash matches the hash included in the command comprises determining if the local UDS hash is equal to the hash included in the command.

14. The method of claim 13, wherein writing the public key to a key storage area comprises overwriting an existing key stored in the key storage area.

15. The method of claim 13, wherein returning a failure response comprises returning failure response data as part of the failure response.

16. A non-transitory computer-readable storage medium for tangibly storing computer program instructions capable of being executed by a computer processor in a memory device, the computer program instructions defining steps of:
- receiving, by the memory device, a command, the command including a public key and a hash of a unique device secret (UDS);
- generating, by the memory device, a local UDS using the public key and a locally stored private key;
- generating, by the memory device, a local UDS hash by inputting the local UDS into a hashing algorithm;
- determining, by the memory device, whether the local UDS hash matches the hash included in the command;
- writing, by the memory device, the public key to a key storage area if the local UDS hash matches the hash included in the command; and
- returning, by the memory device, a failure response if the local UDS hash does not match the hash included in the command,
- wherein writing the public key to a key storage area comprises overwriting an existing key stored in the key storage area.

17. The non-transitory computer-readable storage medium of claim 16, wherein determining whether the local UDS hash matches the hash included in the command comprises determining if the local UDS hash is equal to the hash included in the command.

18. The non-transitory computer-readable storage medium of claim 16, wherein returning a failure response comprises returning failure response data as part of the failure response.

* * * * *